O. C. COOK.
DIRECTION INDICATOR FOR AUTOMOBILES.
APPLICATION FILED FEB. 19, 1920.
1,388,550.
Patented Aug. 23, 1921.
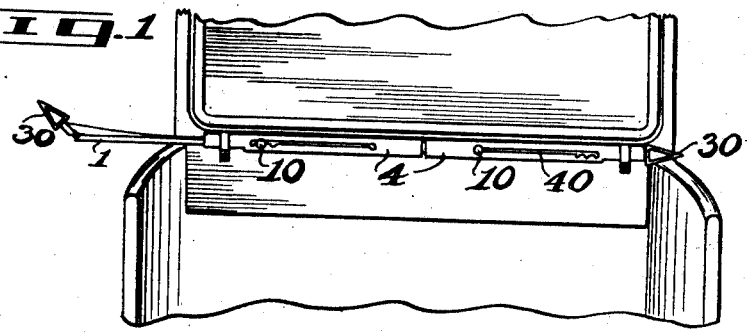
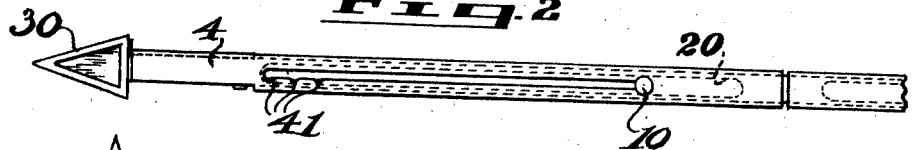
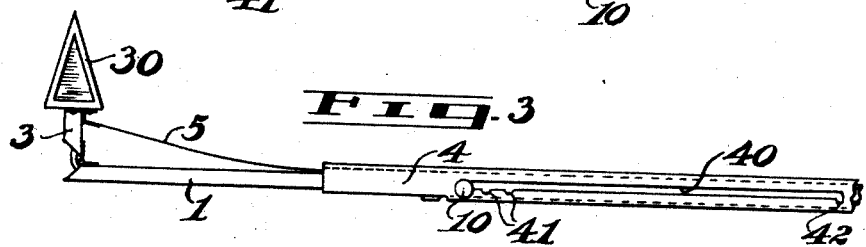
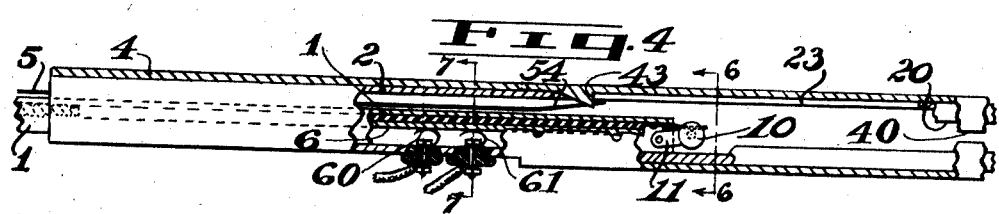
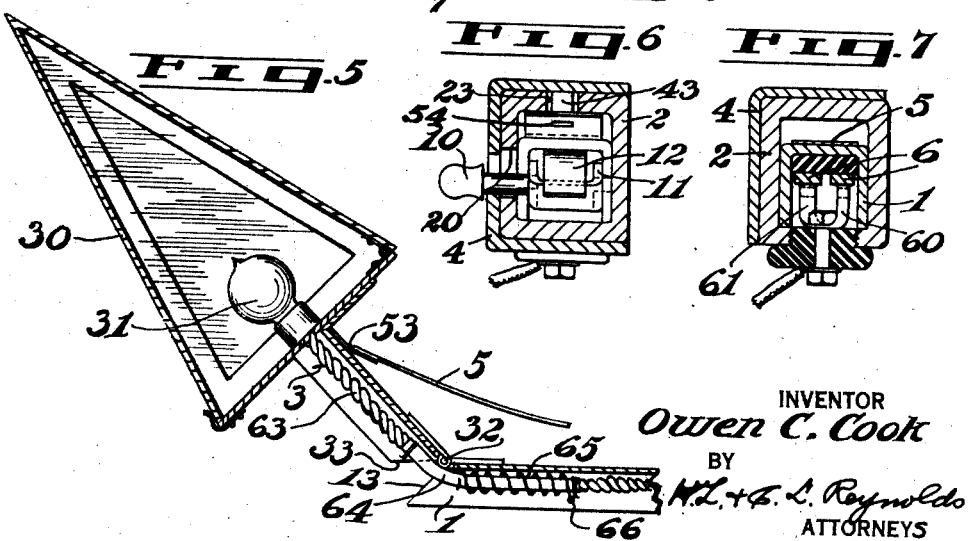
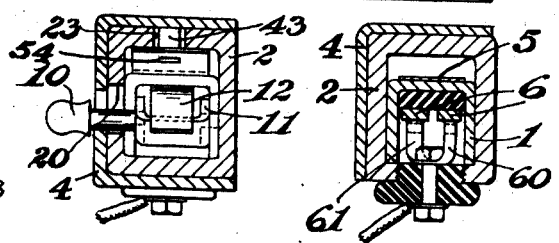
INVENTOR
Owen C. Cook
BY
W. L. + C. L. Reynolds
ATTORNEYS

UNITED STATES PATENT OFFICE.

OWEN C. COOK, OF KING COUNTY, WASHINGTON.

DIRECTION-INDICATOR FOR AUTOMOBILES.

1,388,550.  Specification of Letters Patent.  Patented Aug. 23, 1921.

Application filed February 19, 1920. Serial No. 359,999.

*To all whom it may concern:*

Be it known that I, OWEN C. COOK, a citizen of the United States of America, and resident of King county, State of Washington, have invented certain new and useful Improvements in Direction-Indicators for Automobiles, of which the following is a specification.

My invention relates to direction indicators for automobiles and like vehicles.

The object of my invention is to produce a direction indicator for vehicles which is compact and accessible, and which will attract attention thereto when it is desired to change the direction or motion of the vehicle.

Another object of my invention is to provide a direction indicator for automobiles which will show by its position the character of the change about to take place in the vehicle's motion.

Another object of my invention is to provide a direction indicator for automobiles which may be cut down or adjusted to enable it to be fitted to different sizes of vehicles.

My invention comprises the novel parts and combinations of parts which are shown in the accompanying drawings, described in the specification and defined by the claims terminating the same.

In the accompanying drawings I have shown my invention in the form which is now preferred by me.

Figure 1 is an elevation of my device attached to the dash-board of an automobile as it would be seen from the driver's seat, both right-hand and left-hand signals being shown.

Fig. 2 is an elevation of one of the like halves of my device, parts being shown in the retracted position.

Fig. 3 is an elevation of my device similar to Fig. 2, showing the device in the outermost projected position.

Fig. 4 is a sectional view of a part of my device, parts being broken away.

Fig. 5 is a sectional view of the signal and its immediate connections.

Fig. 6 is a section, on the line 6—6 of Fig. 4.

Fig. 7 is a section on the line 7—7 of Fig. 4.

In operating vehicles, particularly automobiles, it is common for the driver to signal with one arm or the other to indicate when he is about to make a turn, when he is about to stop, and when he wishes to back up. The commonly accepted signal for a turn is the horizontal projection of his arm to one side or the other. He signals his intention to stop by raising his arm at an angle above the horizontal. When he wishes to back up he signals the vehicles behind him by raising his arm vertically. My direction indicating device is constructed with a signal arm which simulates the signals ordinarily given by the driver's arm. I prefer that the signal arm be illuminated at night so that it may be readily seen and understood by drivers of following vehicles. This is a desirable but not an essential part of my invention.

The supporting bar 1 is secured in any suitable casing or guide to be projected laterally from the vehicle. The guide arm shown consists of the sleeve 4 which is secured to the dash-board of an automobile immediately below the wind-shield, and in position that the operating handles of the device are accessible from the driver's seat. Pivoted upon the supporting bar or slide 1 is the signal arm 3. This may be secured upon the outer end of the supporting bar 1 and may be provided with a suitable arrow head 30. As herein shown this is provided with a suitable light bulb 31, which is connected, through a switch to be hereinafter described, to a suitable source of electric current so that the signal 30 may be illuminated at night.

The supporting arm 1 and the signal arm 3 are preferably formed of a channeled cross-section, and the signal arm is pivoted upon the supporting bar at 32. Limit stops which, as herein shown, consists of the inclined surfaces 33 upon the arm 3 and 13 upon the supporting bar 1, coöperate to prevent movement of the signal arm 3 downward from the horizontal.

The supporting bar 1 is provided with suitable handles 10, which may be secured upon a short link 11 which is pivoted upon the inner end of the bar 1, and which projects through a slot 20 in the sleeve 2. A cover plate 4 may be provided if desired. This plate, if it is employed, contains the notches 41 which are employed to accurately position the supporting bar 1 in its signaling positions, and the plate may also contain a notch 42 to receive the handle 10 in its retracted position. A slot 40 in the plate connects the notches 41 and 42, and permits the handle 10 to move from one notch to another. The spacing between these notches or stops is a fixed factor for each signal. If desired a spring 12 may be employed to press the handle 10 into the proper stops 41 and 42.

Also secured upon the plate 4 is a stop 43 which projects through a slot 23 in the sleeve 2. This stop 43, which I have called a signal arm stop, should be fixed in position relative to the stops 41. Although the stops 41 and 43 might be contained in the sleeve 2 I prefer to form them in the plate 4 which is adjustable lengthwise of the sleeve 2 in order to adapt the device for use upon different cars having wind-shields of different widths. The sleeve 2 may be made of a size to be fitted upon the widest wind-shield, and if it is desired to fit it upon a narrower wind-shield, this may be done by cutting off the end of the sleeve ends and moving the plate 4 inward upon the sleeve.

In order to vary the position of the signal arm 3 by the movement of the supporting bar 1 I provide a wire or plate 5 which is secured to the signal arm, as at 53, and which extends within the sleeve 2 upon the top of the supporting bar 1. Preferably the plate 5 has a certain amount of resiliency. Its inner end is upturned and is provided with a slot 54 which is adapted to engage the stop 43 when the support 1 is projected sufficiently for its handle 10 to engage the innermost of the slots 41. It will be seen that any further projection of the support bar 1, as for instance, enough to cause the handle 10 to fall into the middle notch 41, will cause the signal arm 3 to swing upward or into the position shown in Figs. 1 and 5. The member 5 acts as a tension member. A still further projection of the supporting bar 1 causes the signal arm 3 to be thrown vertically upward into the position shown in Fig. 3. Reversing the movement of the supporting bar 1 causes the signal arm 3 to fall into a horizontal position; the slot 54 in the end of the tension member 5 is released from the stop 43, and both the supporting bar and the signal arm 3 may be withdrawn within the sleeve 2.

As it is desired to light the bulb 31 only when the device is in signaling position I provide a pair of insulated contact plates 6 upon the under side of the supporting bar 1 which are engaged by brushes 60 and 61 connected to the terminals of a suitable electric circuit. The contact plates 6 should be of such length that the brushes 60 and 61 will engage with them only when the supporting bar 1 is projected into or nearly to its first signaling position. They should be of such length as to keep the bulb lighted while the signal arm 1 is in any signaling position, either before or after cutting off the ends of the sleeve 2.

In order that the circuit wires 63 leading from the contact plates 6 to the bulb 31 may not be caught and pinched at the hinged support 32 of the signal arm, I may inclose the portion which passes about this pivot 32 in a protective casing 64. As a further protection I may secure a spring 65 to the wires 63 by one end and to the supporting bar 1, as at 66, by its other end. This serves to keep the wires 63 under tension at all times and to retract them beyond the hinge 32 when the signal arm 3 is lowered.

What I claim as my invention is:

1. A direction indicator for automobiles comprising a laterally projectable support and a signal arm secured thereon to move relative thereto into a plurality of predetermined signaling positions, and stops for positioning said signal arm in each signaling position.

2. A direction indicator for automobiles comprising a fixed sleeve, a support bar slidable therein and laterally projectable therefrom, a signal arm pivotally mounted upon said support bar for movement into a plurality of predetermined signaling positions, stops carried by said sleeve for positioning said support bar in a plurality of signaling positions, a signal arm stop carried by said sleeve, and a plate having a slot in one end and secured to the signal arm by its other end, said slot being engageable with the signal arm stop to move the signal arm into a plurality of predetermined signaling positions.

3. A direction indicator for automobiles comprising a fixed sleeve, a support bar slidable therein, a signal arm pivotally mounted upon said support bar for movement into a plurality of predetermined signaling positions, a plurality of stops engageable by said support bar, a signal arm stop fixed relative to said first stops, and means secured to said signal arm and engageable with said signal arm stop to control the position of said signal arm by the position of the support bar within the sleeve.

4. A direction indicator for automobiles comprising a fixed sleeve, a support bar slidable therein, a signal arm pivotally mounted upon said support bar for movement into a plurality of predetermined signaling positions, a signal carried by the outer end of said signal arm, and a plurality of stops fixed relative to said sleeve for determining the position of said signal arm, said arm and the support bar being retractable within the sleeve when in horizontal alinement.

5. A direction indicator for automobiles comprising a fixed sleeve, a support bar slidable therein, a signal arm pivotally mounted upon the outer end of said support bar for movement into a plurality of predetermined signaling positions ranging upward from the horizontal, limit stops carried by said signal arm and support bar for preventing downward movement past the horizontal, a signal upon the outer end of said signal arm, and a plurality of stops fixed relative to said sleeve for determining the position of said signal arm, said arm and support bar being retractable within the sleeve when said limit stops are in engagement.

6. A direction indicator for automobiles comprising a projectable support bar, a signal arm pivotally mounted upon the outer end of the support bar, a fixed stop, a tension member engageable with said stop and controlled by the projection of said support bar for positioning said signal arm in any one of a plurality of signaling positions.

7. A direction indicator for automobiles comprising a projectable support bar, a signal arm pivotally mounted upon the outer end of the support bar, a fixed stop, and means engageable with said stop and controlled by the projection of said support bar for positioning said signal arm in any one of a plurality of signaling positions.

8. A direction indicator for automobiles comprising a fixed sleeve having slots therein, a support bar slidable in said sleeve, a signal arm secured upon said support bar and movable thereon into a plurality of signaling positions, a plurality of stops for determining the position of the support bar and a signal arm stop for determining the position of the signal arm, and a plate secured on the sleeve and adjustable thereon, said stops being secured on said plate and connecting with their coöperating parts through the slots in the sleeve.

Signed at Seattle, King county, Washington, this 11th day of February, 1920.

OWEN C. COOK.